(12) United States Patent
Oberdorfer

(10) Patent No.: US 10,378,604 B2
(45) Date of Patent: Aug. 13, 2019

(54) SLACK ADJUSTER FOR A DRUM BRAKE OF A VEHICLE AIR BRAKING SYSTEM

(71) Applicant: Bendix Spicer Foundation Brake LLC, Elyria, OH (US)

(72) Inventor: Erik W Oberdorfer, Akron, OH (US)

(73) Assignee: Bendix Spicer Foundation Brake LLC, Elyria, OH (US)

(*) Notice: Subject to any disclaimer, the term of this patent is extended or adjusted under 35 U.S.C. 154(b) by 43 days.

(21) Appl. No.: 15/834,200

(22) Filed: Dec. 7, 2017

(65) Prior Publication Data

US 2019/0178319 A1 Jun. 13, 2019

(51) Int. Cl.
*F16D 65/58* (2006.01)
*F16D 51/18* (2006.01)

(52) U.S. Cl.
CPC ............ *F16D 65/58* (2013.01); *F16D 51/18* (2013.01)

(58) Field of Classification Search
CPC ........... F16D 65/58; F16D 51/18; F16D 65/60
USPC ....................................... 188/196 BA, 79.55
See application file for complete search history.

(56) References Cited

U.S. PATENT DOCUMENTS

| | | |
|---|---|---|
| 3,013,638 A | 12/1961 | Satrum |
| 3,997,036 A | 12/1976 | Zeidler |
| 4,088,206 A * | 5/1978 | Garrett .................... F16D 65/60 188/196 D |
| 4,164,272 A * | 8/1979 | Neuman .................. F16D 65/60 188/196 D |
| 4,256,208 A * | 3/1981 | Najer ...................... F16D 65/60 188/196 D |
| 7,708,122 B2 | 5/2010 | Plantan |
| 8,245,820 B2 | 8/2012 | Echambadi |
| 8,302,742 B2 | 11/2012 | Louis |
| 8,302,744 B2 | 11/2012 | Louis |
| 8,973,722 B2 | 3/2015 | Kromer |
| 9,360,070 B2 | 6/2016 | Gripemark |
| 2010/0018812 A1 | 1/2010 | Louis |

OTHER PUBLICATIONS

European Patent Office, "Written Opinion and Search Report of the International Searching Authority," Search Report, dated Mar. 13, 2019, 9 pages European Patent Office, Rijswijk Netherlands.

* cited by examiner

*Primary Examiner* — Melanie Torres Williams
(74) *Attorney, Agent, or Firm* — Cheryl Greenly; Brian Kondas; Eugene Clair

(57) ABSTRACT

A slack adjuster is provided for a drum brake of a vehicle air braking system. The slack adjuster comprises a gear set including (i) a worm wheel having an outer circumferential surface, and (ii) a worm shaft having a longitudinal central axis and meshed with the worm wheel. The worm shaft is rotated in one direction about its longitudinal central axis when the drum brake is applied and adjustment is required and in an opposite direction about its longitudinal central axis when the drum brake is released. The slack adjuster further comprises an anti-reversing member having an inner circumferential surface facing the outer circumferential surface of the worm wheel. The anti-reversing member allows rotation of the worm wheel when the drum brake is applied and prevents rotation of the worm wheel when the drum brake is released.

22 Claims, 5 Drawing Sheets

SLACK ADJUSTER FOR A DRUM BRAKE OF A VEHICLE AIR BRAKING SYSTEM

BACKGROUND OF THE INVENTION

The present application relates to vehicle air braking systems, and is particularly directed to a slack adjuster for a drum brake of a vehicle air braking system, such as a heavy vehicle air braking system.

A typical drum brake includes a brake shoe that engages a wheel drum to transmit braking torque through a brake spider to a wheel axle. One end of the brake shoe is pivotable against an anchor pin that is attached to one side of the brake spider. A cam follower roller is disposed at the other end of the brake shoe. When a service brake application occurs, a camshaft located on the side of the brake spider opposite the anchor pin is actuated to rotate about its longitudinal central axis. As the camshaft rotates about its longitudinal central axis, a cam surface of an S-cam mounted on the camshaft acts against the cam follower roller to pivot the brake shoe about the anchor pin. As the brake shoe pivots about the anchor pin, the brake lining of the brake shoe frictionally engages the wheel drum to transmit braking torque through the brake spider to the wheel axle and thereby to decelerate and brake the vehicle.

In a typical S-cam type of drum brake, a pneumatic system is linked by an air line to a spring brake chamber. The spring brake chamber is connected by a push rod and clevis to an arm of a slack adjuster. The slack adjuster is the link between the spring brake chamber and the camshaft. More specifically, the slack adjuster includes a yoke to which the push rod from the spring brake chamber is fastened, and a spline that is installed on a spline of the camshaft. The slack adjuster converts a linear force of the push rod from the spring brake chamber into a torsional force that acts on the camshaft to rotate the camshaft about its longitudinal central axis. The entire slack adjuster operates as a unit, rotating as a lever with the camshaft as the brakes are applied or released.

The slack adjuster is also equipped with an adjusting mechanism to provide a means of adjusting for brake lining wear. In particular, the clearance between the brake lining and the wheel drum is adjusted to compensate for the gradual wear on the brake lining of the brake shoe. The adjusting mechanism is usually a clutch-type mechanism that continuously adjusts in very small increments as wear of the brake lining and the wheel drum occurs. Accordingly, those skilled in the art continue with research and development efforts in adjusting mechanisms of slack adjusters for S-cam drum brakes.

SUMMARY OF THE INVENTION

In accordance with one example embodiment, a slack adjuster is provided for a drum brake of a vehicle air braking system. The slack adjuster comprises a gear set including (i) a worm wheel having an outer circumferential surface, and (ii) a worm shaft having a longitudinal central axis and meshed with the worm wheel. The worm shaft is rotated in one direction about its longitudinal central axis when the drum brake is applied and adjustment is required and in an opposite direction about its longitudinal central axis when the drum brake is released. The slack adjuster further comprises an anti-reversing member having an inner circumferential surface facing the outer circumferential surface of the worm wheel. The anti-reversing member allows rotation of the worm wheel when the drum brake is applied and prevents rotation of the worm wheel when the drum brake is released.

In accordance with another example embodiment, a slack adjuster is provided for a drum brake of a vehicle air braking system. The slack adjuster comprises a gear set including (i) a worm wheel having an outer circumferential surface and gear teeth disposed on the outer circumferential surface, and (ii) a worm shaft having a longitudinal central axis and gear teeth that is meshed with the gear teeth on the worm wheel. The worm shaft is rotated in one direction about its longitudinal central axis when the drum brake is applied and adjustment is required and in an opposite direction about its longitudinal central axis when the drum brake is released. The slack adjuster further comprises an anti-reversing member having an inner circumferential surface and gear teeth disposed on the inner circumferential surface. The gear teeth on the inner circumferential surface of the anti-reversing member is configured to mesh with the gear teeth on the outer circumferential surface of the worm wheel to prevent rotation of the worm wheel only when the drum brake is released.

In accordance with yet another example embodiment, a slack adjuster is provided for a drum brake of a vehicle air braking system. The slack adjuster comprises a gear set including a worm wheel and a worm shaft having a longitudinal central axis and operatively engaged with the worm wheel. The worm shaft is rotated in one direction about its longitudinal central axis when the drum brake is applied and adjustment is required and in an opposite direction about its longitudinal central axis when the drum brake is released. The slack adjuster further comprises means for enabling the worm wheel to rotate when the drum brake is applied and for acting directly on the worm wheel to prevent rotation of the worm wheel when the drum brake is released.

In accordance with still another example embodiment, a method is provided of operating a drum brake of a vehicle air braking system having a slack adjuster. The method comprises positioning an anti-reversing member relative to a worm wheel having a longitudinal central axis such that the anti-reversing member directly acts on the worm wheel to resist rotation of the worm wheel about the longitudinal central axis when a clutch pinion of a clutch assembly returns to home position in response to the drum brake being released.

DETAILED DESCRIPTION

Figure 1:
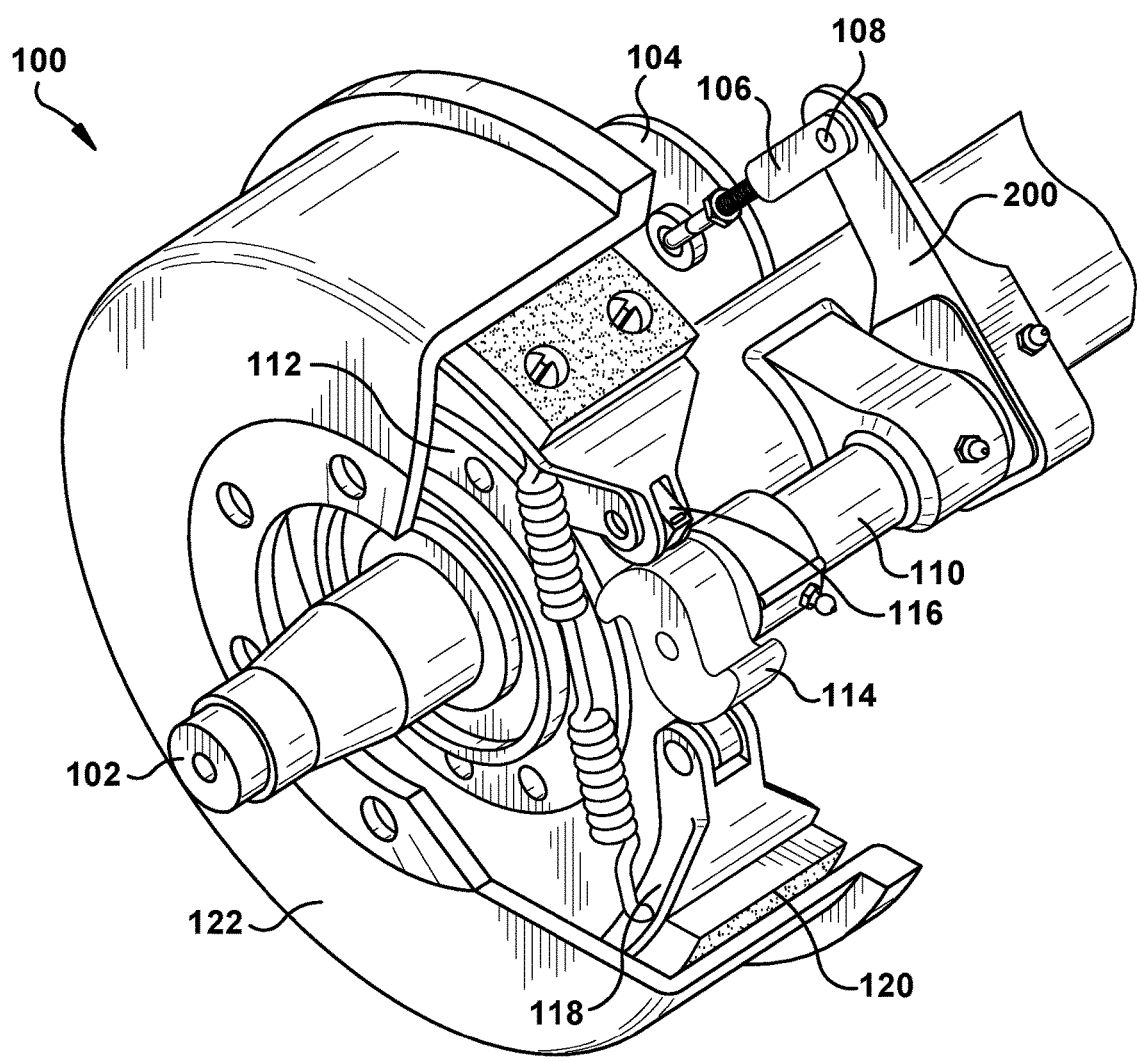
FIG. 1 is a perspective view of a drum brake apparatus embodying a slack adjuster constructed in accordance with an example embodiment.
Figure 2:
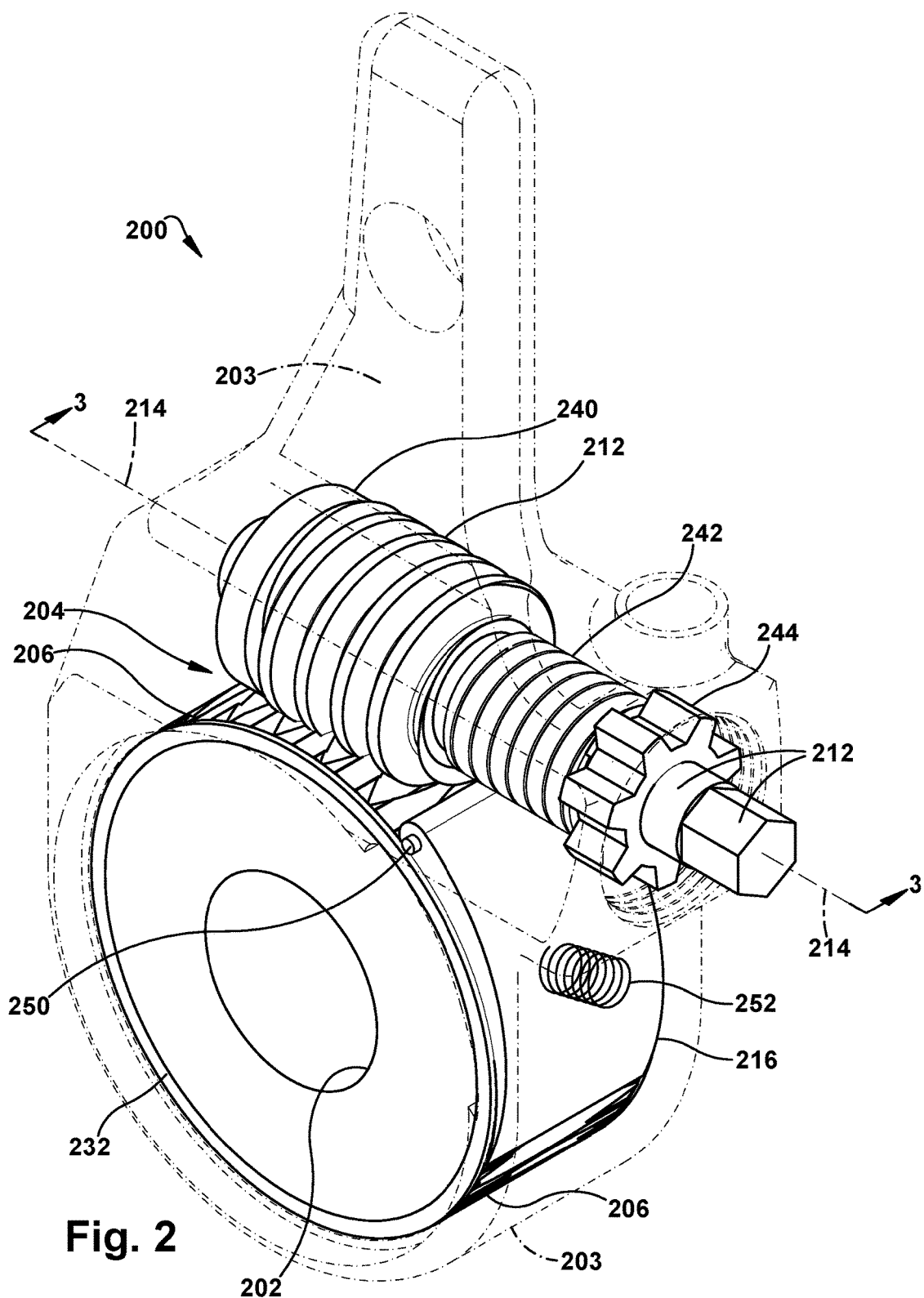
FIG. 2 is an enlarged perspective view of the slack adjuster shown in FIG. 1.

Referring to FIG. 1, a perspective view of a drum brake apparatus 100 embodying a slack adjuster 200 constructed in accordance with an example embodiment is illustrated. The slack adjuster 200 is for a drum brake of a vehicle air braking system. FIG. 2 is an enlarged perspective view of the slack adjuster 200 shown in FIG. 1. The drum brake apparatus 100 is located at an end of a wheel axle 102, and generally includes a spring brake chamber 104 that is connected via a pushrod 106 and clevis 108 to the slack adjuster 200.

The slack adjuster 200 has a spline 202 (FIG. 2) that is installed on a spline (not shown) of a camshaft 110 (FIG. 1). The camshaft 110 is located on one side of a brake spider 112. An S-cam 114 is mounted on the camshaft 110 and acts against a cam follower roller 116 to pivot a brake shoe 118 about an anchor pin (not shown) that is attached to an opposite side of the brake spider 112.

When the brake is applied, the linear force on the pushrod 106 from the spring chamber 104 is converted by the slack adjuster 200 to a torsional force on the camshaft 110 which, in turn, rotates the S-cam 114 against the cam follower roller 116 to pivot the brake shoe 118 about the anchor pin. As the brake shoe 118 pivots about the anchor pin, friction material 120 of the brake shoe 118 engages a wheel drum 122 to transmit braking torque through the brake spider 112 to the wheel axle 102 to decelerate and brake the vehicle.

Figure 3:
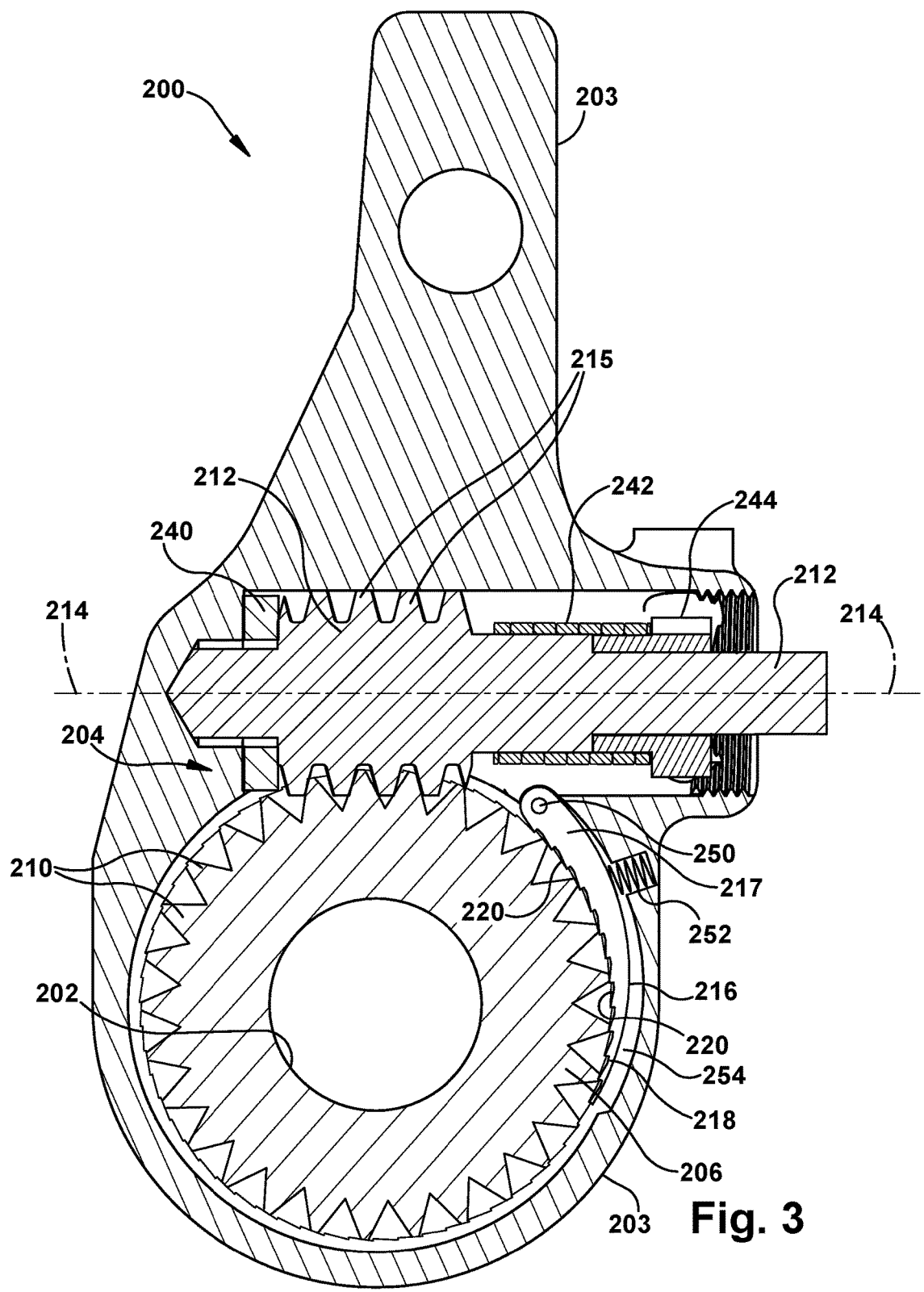
FIG. 3 is an elevational view looking approximately in the direction of arrow "3" shown in FIG. 2.
Figure 4:
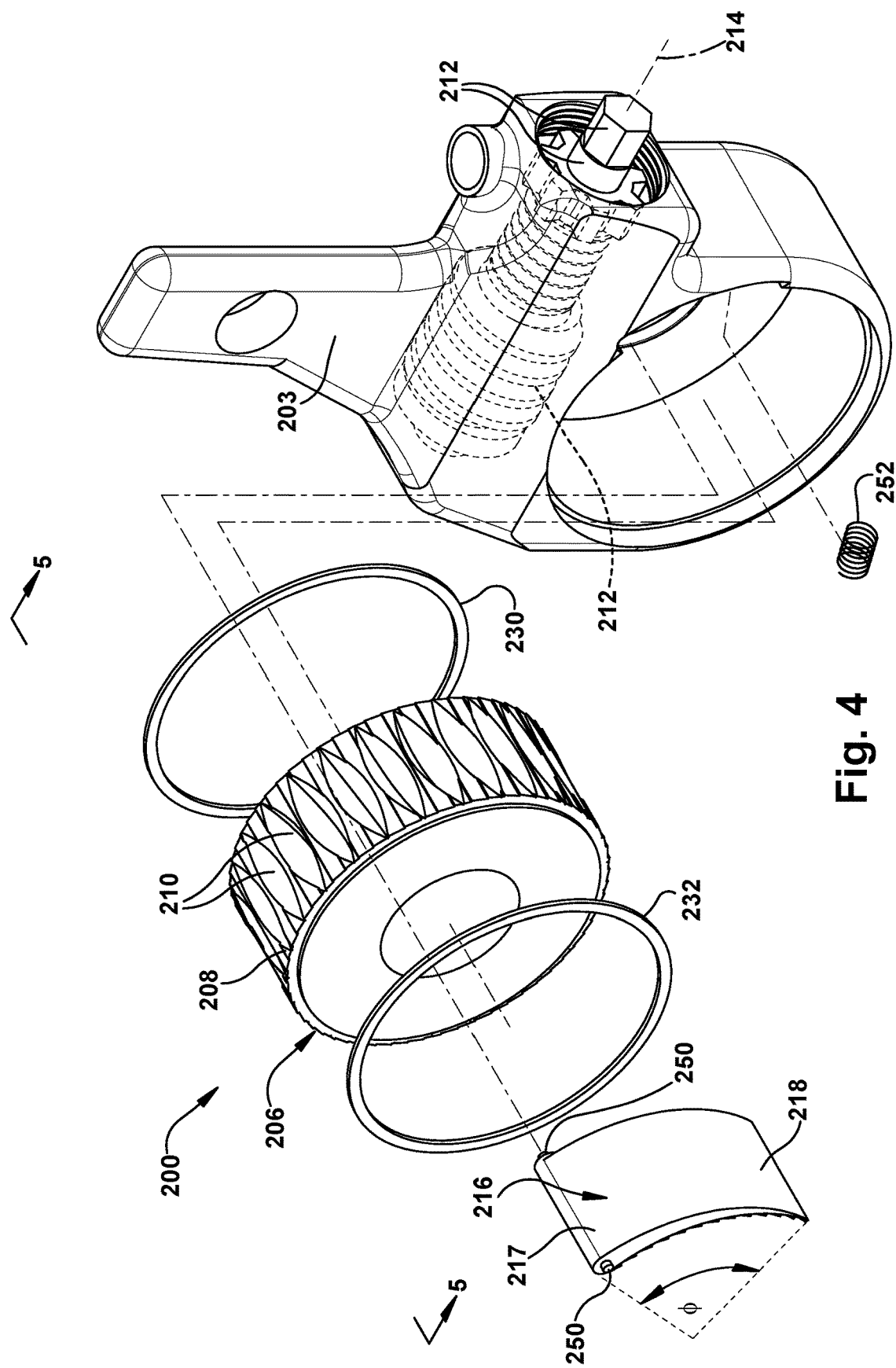
FIG. 4 is an exploded view of the slack adjuster shown in FIG. 2.
Figure 5:
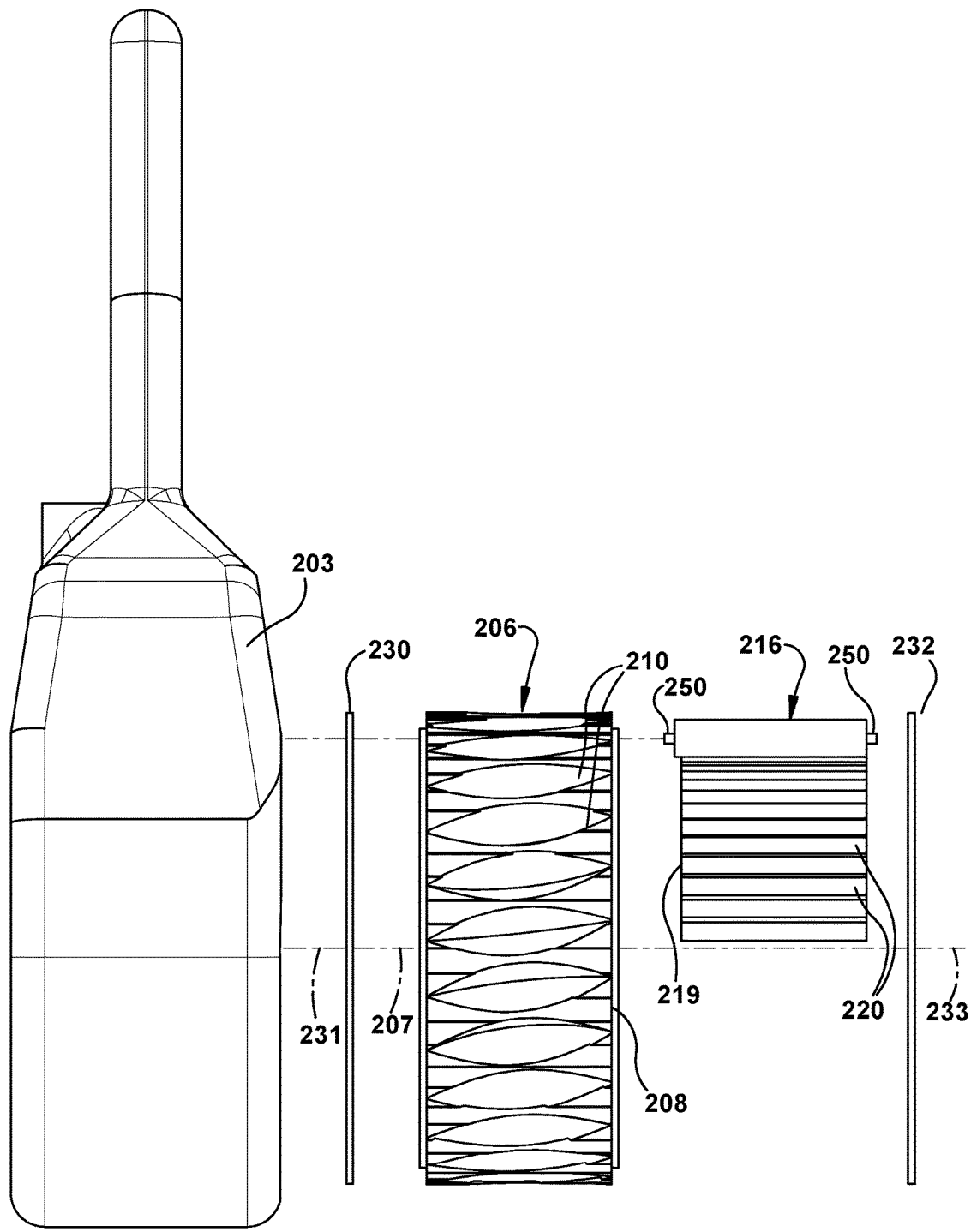
FIG. 5 is an elevational view taken approximately along line 5-5 shown in FIG. 4.

Referring to FIG. 3, an elevational view looking approximately in the direction of arrow "3" shown in FIG. 2 is illustrated. FIG. 4 is an exploded view of the slack adjuster 200 shown in FIG. 2. FIG. 5 is an elevational view taken approximately along line 5-5 shown in FIG. 4. The slack adjuster 200 includes a housing 203 in which a gear set 204 is disposed. The gear set 204 includes a worm wheel 206 that has an outer circumferential surface 208 (FIG. 4) and gear teeth 210 disposed on the outer circumferential surface 208. The gear set 204 further includes a worm shaft 212 that has a longitudinal central axis 214 and gear teeth 215 (FIG. 3) that is meshed with the gear teeth 210 on the worm wheel 206. The worm shaft 212 is rotated in one direction about its longitudinal central axis 214 when the drum brake is applied and adjustment is required and in an opposite direction about its longitudinal central axis 214 when the drum brake is released.

A clutch spring 242 is disposed on a portion of the worm shaft 212. The clutch spring 242 is a wrap spring style clutch. A clutch pinion 244 is adjacent to the clutch spring 242 and is disposed on another portion of the worm shaft 212. The clutch spring 242 and the clutch pinion 244 comprise a clutch assembly. Structure and operation of clutch assemblies are known and, therefore, will not be described. As best shown in FIG. 3, a thrust washer 240 is disposed between the a mating face of the housing 203 and the worm shaft 212, and supports the worm shaft 212 and the clutch assembly for rotation about the longitudinal central axis 214.

The slack apparatus 200 further includes an anti-reversing member 216 that has an inner circumferential surface 219 (FIG. 5) and gear teeth 220 disposed on the inner circumferential surface 219. The inner circumferential surface 219 of the anti-reversing member 216 faces the outer circumferential surface 208 of the worm wheel 206. The gear teeth 220 on the inner circumferential surface 219 of the anti-reversing member 216 is configured to mesh with the gear teeth 210 on the outer circumferential surface 208 of the worm wheel 206 to prevent rotation of the worm wheel 206 only when the drum brake is released.

More specifically, the gear teeth 220 of the anti-reversing member 216 and the gear teeth 210 of the worm wheel 206 comprise a matching one-way tooth pattern. The gear teeth 220 and the gear teeth 210 are aligned with each other before the anti-reversing member 216 and the worm wheel 206 are inserted as a unit into the housing 203 during assembly of the slack adjuster 200. As best shown in FIG. 3, one end portion 217 of the anti-reversing member 216 is thicker than an opposite end portion 218 of the anti-reversing member 216 such that the cross-sectional profile of the anti-reversing member 216 has a curved teardrop shape. The anti-reversing member 216 comprises a solid metallic type of material selected for its rigidity and lubricity. These are only example materials, and other types of materials are possible.

The thicker end portion 217 of the anti-reversing member 216 includes one or more protruding pins or dowels 250. Each of the protruding pins 250 fits into a hole/slot (not shown) in the housing 203 to support the anti-reversing member 216 for pivoting movement about the protruding pins 250. Thus, the housing 203 supports the anti-reversing member 216 at the protruding pins 250 for pivoting movement about the protruding pins 250.

The slack adjuster 200 further comprises a first wear ring 230 (FIGS. 4 and 5) disposed on one side of the worm wheel 206. The first wear ring 230 has a longitudinal central axis 231 (FIG. 5) that is concentric with a longitudinal central axis 207 of the worm wheel 206. A second wear ring 232 is disposed on an opposite side of the worm wheel 206. The second wear ring 232 has a longitudinal central axis 233 that is concentric with the longitudinal central axis 207 of the worm wheel 206. The first and second wear rings 230, 232 provide a low-friction interface with the housing 203.

The inner circumferential surface 219 of the anti-reversing member 216 has a curvature that substantially conforms to curvature of the outer circumferential surface 208 of the worm wheel 206. The inner circumferential surface 219 of the anti-reversing member 216 extends between about five degrees and 180 degrees over the outer circumferential surface 208 of the worm wheel 206. In some embodiments, the inner circumferential surface 219 of the anti-reversing member 216 extends about sixty degrees over the outer circumferential surface 208 of the worm wheel 206, as illustrated as angle "φ" in FIG. 4.

As best shown in FIG. 3, a release spring 252 is disposed between the anti-reversing member 216 and the housing 203. More specifically, the release spring 252 fits into a hole in the housing 203 so that the release spring 252 can be maintained in its position. During assembly, the release spring 252 can be inserted from one side of the hole, for example. As another example, the release spring 252 can be inserted into a hole that extends completely through the wall of the housing 203. After the release spring 252 is inserted into position, the hole is then capped off.

The release spring 252 biases the anti-reversing member 216 toward the worm wheel 206. The release spring 252, when removed from its hole, releases the gear teeth 220 of the anti-reversing member 216 from the gear teeth 210 of the worm wheel 206 to allow the drum brake to be reset (e.g., when new brake shoes are being installed). A small gap 254 (FIG. 3) is formed in the wall of the housing 203 in the vicinity of the anti-reversing member 216 to allow the anti-reversing member 216 to be pivoted about its protruding pins 250 away from the worm wheel 206. It is conceivable that a member or mechanism other than in the form of a release spring can be used. For example, a pawl can be used instead of a release spring. As another example, a release mechanism that extends to the outer part of the housing 203 can be provided to allow for manual release.

During operation of the slack adjuster 200, the anti-reversing member 216 is positioned relative to the worm wheel 206 such that the anti-reversing member 216 allows the worm wheel 206 to rotate about the longitudinal central axis 214 when the worm shaft 212 and the clutch spring 242 of the clutch assembly cooperate together to adjust for excess stroke or clearance detected in response to the drum brake being applied. The gear teeth 220 of the anti-reversing member 216 skip over the gear teeth 210 of the worm wheel 206.

The anti-reversing member is also positioned relative to the worm wheel such that the gear teeth 220 of the anti-reversing member 216 engages the gear teeth 210 on the worm wheel 206 to resist rotation of the worm wheel 206 about the longitudinal central axis 214 when the clutch pinion 244 of the clutch assembly returns to home position in response to the drum brake being released. In some embodiments, the gear teeth 220 of the anti-reversing member 216 engages the gear teeth 210 on the worm wheel 206 to provide between about five foot-pounds of torque and about twenty foot-pounds of torque to resist rotation of the worm wheel 206 about the longitudinal central axis 214.

It should be apparent that the anti-reversing member 216 provides a means for enabling the worm wheel 206 to rotate when the drum brake is applied and for acting directly on the worm wheel 206 to prevent rotation of the worm wheel 206 when the drum brake is released. Since the gear teeth 220 of the anti-reversing member 216 mesh the gear teeth 210 of the worm wheel 206, the worm wheel 206 is held in position and is unable to "de-adjust" when the drum brake is released. The anti-reversing member 216 of the slack adjuster 200 provides a more robust and higher amount of force to resist de-adjustment as compared to known slack adjusters in which a spring element is used to resist de-adjustment.

It should also be apparent that the anti-reversing member 216 has a construction that is not damaged or worn when the drum brake is backed off, such as during maintenance and/or repair of the drum brake.

It should further be apparent that the slack adjuster 200 constructed in accordance with the above-described example embodiment is relatively easy to fabricate and assemble. The slack adjuster 200 is also relatively easy to install in retrofit applications as well as new production applications.

Although the above description describes the slack adjuster 200 being used in a heavy vehicle such as a truck, it is conceivable that the slack adjuster 200 may be used in other types of commercial vehicles, such as busses for example.

While the present disclosure has been illustrated by the description of example processes and system components, and while the various processes and components have been described in detail, applicant does not intend to restrict or in any way limit the scope of the appended claims to such detail. Additional modifications will also readily appear to those skilled in the art. The disclosure in its broadest aspects is therefore not limited to the specific details, implementations, or illustrative examples shown and described. Accordingly, departures may be made from such details without departing from the spirit or scope of applicant's general concept.

What is claimed is:

1. A slack adjuster for a drum brake of a vehicle air braking system, the slack adjuster comprising:
    a gear set including (i) a worm wheel having an outer circumferential surface, and (ii) a worm shaft having a longitudinal central axis and meshed with the worm wheel, wherein the worm shaft is rotated in one direction about its longitudinal central axis when the drum brake is applied and adjustment is required and in an opposite direction about its longitudinal central axis when the drum brake is released; and
    an anti-reversing member having an inner circumferential surface facing the outer circumferential surface of the worm wheel, wherein the anti-reversing member allows rotation of the worm wheel when the drum brake is applied and prevents rotation of the worm wheel when the drum brake is released and one end portion of the anti-reversing member is thicker than an opposite end portion of the anti-reversing member such that the cross-sectional profile of the anti-reversing member has a curved teardrop shape.

2. A slack adjuster according to claim 1, further comprising:
    a first wear ring disposed on one side of the worm wheel and having a longitudinal central axis that is concentric with a longitudinal central axis of the worm wheel; and
    a second wear ring disposed on an opposite side of the worm wheel and having a longitudinal central axis that is concentric with the longitudinal central axis of the worm wheel.

3. A slack adjuster according to claim 1, wherein the anti-reversing member comprises a metallic type of material.

4. A slack adjuster according to claim 1, wherein curvature of the inner circumferential surface of the anti-reversing member substantially conforms to curvature of the outer circumferential surface of the worm wheel.

5. A slack adjuster according to claim 4, wherein the inner circumferential surface of the anti-reversing member extends between about five degrees and 180 degrees over the outer circumferential surface of the worm wheel.

6. A slack adjuster according to claim 1, further comprising:
    a release spring that biases the anti-reversing member toward the worm wheel and for, when removed, allows the drum brake to be reset.

7. A slack adjuster for a drum brake of a vehicle air braking system, the slack adjuster comprising:
    a gear set including (i) a worm wheel having an outer circumferential surface and gear teeth disposed on the outer circumferential surface, and (ii) a worm shaft having a longitudinal central axis and gear teeth that is meshed with the gear teeth on the worm wheel, wherein the worm shaft is rotated in one direction about its longitudinal central axis when the drum brake is applied and adjustment is required and in an opposite direction about its longitudinal central axis when the drum brake is released; and
    an anti-reversing member having an inner circumferential surface and gear teeth disposed on the inner circumferential surface, wherein the gear teeth on the inner circumferential surface of the anti-reversing member is configured to mesh with the gear teeth on the outer circumferential surface of the worm wheel to prevent rotation of the worm wheel only when the drum brake is released.

8. A slack adjuster according to claim 7, further comprising:
    a first wear ring disposed on one side of the worm wheel and having a longitudinal central axis that is concentric with a longitudinal central axis of the worm wheel; and
    a second wear ring disposed on an opposite side of the worm wheel and having a longitudinal central axis that is concentric with the longitudinal central axis of the worm wheel.

9. A slack adjuster according to claim 7, wherein one end portion of the anti-reversing member is thicker than an opposite end portion of the anti-reversing member such that the cross-sectional profile of the anti-reversing member has a curved teardrop shape.

10. A slack adjuster according to claim 7, wherein the anti-reversing member comprises a metallic type of material.

11. A slack adjuster according to claim 7, wherein curvature of the inner circumferential surface of the anti-reversing member substantially conforms to curvature of the outer circumferential surface of the worm wheel.

12. A slack adjuster according to claim 11, wherein the inner circumferential surface of the anti-reversing member extends between about five degrees and 180 degrees over the outer circumferential surface of the worm wheel.

13. A slack adjuster according to claim 12, wherein the inner circumferential surface of the anti-reversing member extends about sixty degrees over the outer circumferential surface of the worm wheel.

14. A slack adjuster according to claim 7, further comprising:
a release spring that biases the anti-reversing member toward the worm wheel and for, when removed, allows the drum brake to be reset.

15. A slack adjuster for a drum brake of a vehicle air braking system, the slack adjuster comprising:
a gear set including a worm wheel and a worm shaft having a longitudinal central axis and operatively engaged with the worm wheel, wherein the worm shaft is rotated in one direction about its longitudinal central axis when the drum brake is applied and adjustment is required and in an opposite direction about its longitudinal central axis when the drum brake is released; and
means for enabling the worm wheel to rotate when the drum brake is applied and for acting directly on the worm wheel to prevent rotation of the worm wheel when the drum brake is released.

16. A slack adjuster according to claim 15, wherein the means comprises an anti-reversing member having an inner circumferential surface that faces an outer circumferential surface of the worm wheel.

17. A slack adjuster according to claim 16, further comprising:
a first wear ring disposed on one side of the worm wheel and having a longitudinal central axis that is concentric with a longitudinal central axis of the worm wheel; and
a second wear ring disposed on an opposite side of the worm wheel and having a longitudinal central axis that is concentric with the longitudinal central axis of the worm wheel.

18. A method of operating a drum brake of a vehicle air braking system having a slack adjuster, the method comprising:

positioning an anti-reversing member relative to a worm wheel having a longitudinal central axis such that the anti-reversing member directly acts on the worm wheel to resist rotation of the worm wheel about the longitudinal central axis when a clutch pinion of a clutch assembly returns to home position in response to the drum brake being released.

19. A method according to claim 18, wherein positioning an anti-reversing member relative to a worm wheel having a longitudinal central axis such that the anti-reversing member directly acts on the worm wheel to resist rotation of the worm wheel about the longitudinal central axis when a clutch pinion of a clutch assembly returns to home position in response to the drum brake being released includes:
positioning the anti-reversing member relative to the worm wheel such that gear teeth of the anti-reversing member engages gear teeth on the worm wheel to resist rotation of the worm wheel about the longitudinal central axis when the clutch pinion of the clutch assembly returns to home position in response to the drum brake being released.

20. A method according to claim 19, wherein positioning the anti-reversing member relative to the worm wheel such that gear teeth of the anti-reversing member engages gear teeth on the worm wheel to resist rotation of the worm wheel about the longitudinal central axis when the clutch pinion of the clutch assembly returns to home position in response to the drum brake being released includes:
positioning the anti-reversing member relative to the worm wheel such that gear teeth of the anti-reversing member engages gear teeth on the worm wheel to provide between about five foot-pounds of torque and about twenty foot-pounds of torques to resist rotation of the worm wheel about the longitudinal central axis when the clutch pinion of the clutch assembly returns to home position in response to the drum brake being released.

21. A method according to claim 20, further comprising:
positioning the anti-reversing member relative to the worm wheel such that the anti-reversing member allows the worm wheel to rotate about the longitudinal central axis when a worm shaft and a clutch spring of the clutch assembly cooperate together to adjust for excess stroke or clearance detected in response to the drum brake being applied.

22. A method according to claim 21, further comprises:
removing a release spring to release the gear teeth of the anti-reversing member from the gear teeth of the worm wheel to allow the drum brake to be reset.

* * * * *